(12) United States Patent
Lemoine

(10) Patent No.: US 11,935,005 B2
(45) Date of Patent: Mar. 19, 2024

(54) SYSTEM AND METHOD FOR FULFILLING REQUESTS FOR COMMUNICATION SERVICES

(71) Applicant: Shutterfly, LLC, Redwood City, CA (US)

(72) Inventor: Brett Lemoine, Mountain View, CA (US)

(73) Assignee: Shutterfly, LLC, San Jose, CA (US)

( * ) Notice: Subject to any disclaimer, the term of this patent is extended or adjusted under 35 U.S.C. 154(b) by 403 days.

(21) Appl. No.: 15/834,363

(22) Filed: Dec. 7, 2017

(65) Prior Publication Data

US 2019/0066050 A1    Feb. 28, 2019

Related U.S. Application Data

(60) Provisional application No. 62/549,557, filed on Aug. 24, 2017.

(51) Int. Cl.
*G06Q 10/101* (2023.01)
*G06Q 10/0631* (2023.01)

(52) U.S. Cl.
CPC ..... *G06Q 10/101* (2013.01); *G06Q 10/06313* (2013.01)

(58) Field of Classification Search
None
See application file for complete search history.

(56) References Cited

U.S. PATENT DOCUMENTS

| | | | | |
|---|---|---|---|---|
| 10,621,646 B2 * | 4/2020 | Bender | ............... | G06Q 30/0631 |
| 2002/0152001 A1 * | 10/2002 | Knipp | ................. | G06Q 10/087 |
| | | | | 700/95 |
| 2011/0145101 A1 * | 6/2011 | Berger | ................ | G06F 16/9535 |
| | | | | 715/764 |
| 2012/0066613 A1 * | 3/2012 | Berger | ................... | G06Q 30/01 |
| | | | | 715/751 |

FOREIGN PATENT DOCUMENTS

CA    2881442 A1 *    9/2015    ........... G06F 17/248

OTHER PUBLICATIONS

Zeng, Jun et al. Operations simulation of on-demand digital print. IEEE Conference Anthology (pp. 1-5) . . . (Year: 2013) (Year: 2013).*

* cited by examiner

*Primary Examiner* — Patricia H Munson
*Assistant Examiner* — Nancy N Prasad
(74) *Attorney, Agent, or Firm* — Merchant & Gould P.C.

(57) ABSTRACT

A network-based communication fulfillment system includes a communication resource allocation server configured to receive a request for a communication service from a business user, wherein the communication service includes electronic communications and physical mailing pieces to be sent to recipients, an intelligent communication design server that can automatically create designs for the electronic communications and the physical mailing pieces, a communication server that can transmit the electronic communications to the recipients, and one or more product fulfillment centers that can print and finish the physical mailing pieces to be mailed to the recipients.

20 Claims, 3 Drawing Sheets

SYSTEM AND METHOD FOR FULFILLING REQUESTS FOR COMMUNICATION SERVICES

TECHNICAL FIELD

This application relates to technologies for automatically allocating communication resources to provide physical and electronic communication services.

BACKGROUND OF THE INVENTION

In modern economy, businesses must engage with their customers with frequent and purposeful communications. The content and the methods of the communications are often customized for individual customers and may rely on data and logic to trigger and populate the appropriate custom messaging. Communications can be conducted in physical mails or electronic forms such as emails, social media, and mobile messages. These various channels may share a large volume of common messaging, branding guidelines, and/or legal requirements compounding the complexity of managing and executing these communications. As business grow through mergers, acquisitions, or purely organically, the size of the communication materials they have to manage and control grows exponentially.

There is therefore a need for timely allocating resources for preparing the content, and producing and fulfilling different physical and electronic forms of communications.

SUMMARY OF THE INVENTION

The present application discloses system and methods that can allocate communication resources to satisfy business customers' complex and varying needs in providing communications to their customers. The communications can be in the form of the mailed hardcopy print products in different sizes, form factors, materials, finishes, and packaging, as well as electronic channels such as emails, social media, and mobile messages.

Furthermore, the presently disclosed system automatically monitors resources required for fulfilling physical and electronic communications, and can automatically evaluate the resource needs in customers' requests for communications and allocate resources based on the availability of resources needed for the design, the production, and the distribution of physical or electronic communications.

In a general aspect, the present invention relates to a network-based communication fulfillment system that includes a communication resource allocation server that can receive a request for a communication service from a business user, wherein the communication service includes electronic communications and physical mailing pieces to be sent to recipients; an intelligent communication design server that can automatically create designs for the electronic communications and the physical mailing pieces; a communication server that can transmit the electronic communications to the recipients; and one or more product fulfillment centers that can print and finish the physical mailing pieces to be mailed to the recipients, wherein the communication resource allocation server can include: a user request analysis module that can automatically analyze types of communications in the request and to automatically determine amounts of design work, printing and finishing work, and transmission work required to fulfill the communication service in the request; one or more modules that can monitor workloads of the one or more product fulfillment centers, the communication server, and the intelligent communication design server; and a communication request resource matching module that can match the available design, printing, and transmission resources with resource needs in the user request.

Implementations of the system may include one or more of the following. The user request analysis module can automatically determine the amount of design work required in the request for the intelligent communication design server based on a level of customization. The user request analysis module can automatically determine the amount of design work required in the request for the intelligent communication design server based on types of the physical mailing pieces. The user request analysis module can automatically determine the amount of design work required in the request for the intelligent communication design server based on a number of variations of different electronic channels including device types, operating systems, types of viewing software, and viewing platforms. The communication resource allocation server can further include a communication resource assignment module that can assign the intelligent communication design server to create designs for the electronic communications and the physical mailing pieces specified in the user request. The communication resource allocation server can further include a communication resource assignment module that can assign the communication server to transmit the electronic communications to the recipients specified in the user request. The communication resource allocation server can further include a communication resource assignment module that can assign the one or more product fulfillment centers to manufacture the physical mailing pieces to be mailed to the recipients specified in the user request. The one or more modules in the communication resource allocation server can include: a printing resource tracking module that can monitor scheduled jobs for printers and finishing equipment in the one or more product fulfillment centers; an electronic communication resource tracking module that can monitor scheduled transmission jobs for the communication server; and a communication design resource tracking module that can monitor scheduled design jobs for the intelligent communication design server.

These and other aspects, their implementations and other features are described in detail in the drawings, the description and the claims.

DETAILED DESCRIPTION OF THE INVENTION

Figure 1:
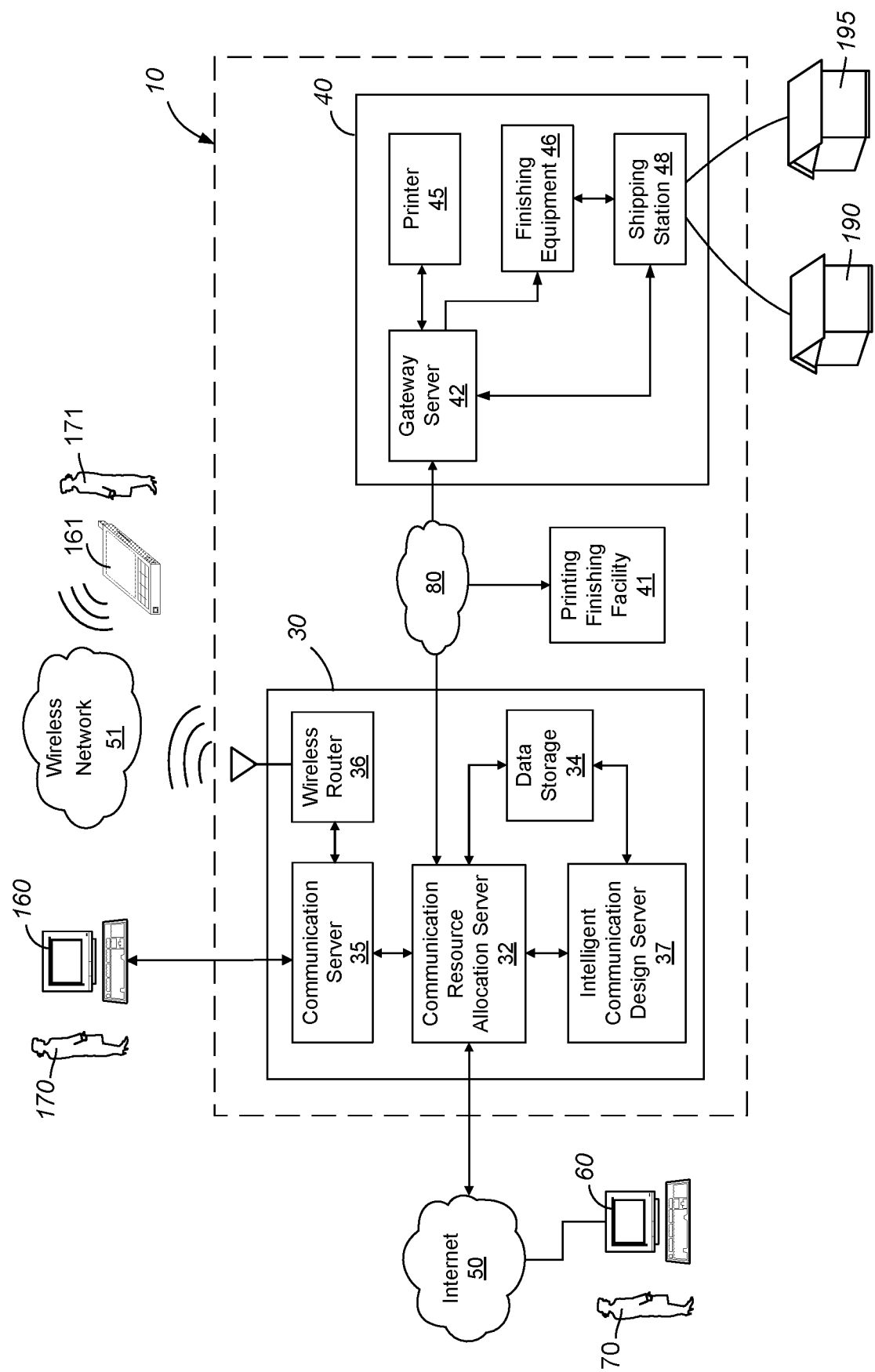
FIG. 1 is a block diagram for a cloud-based communication resource allocation system in accordance with the present invention.

Referring to FIG. 1, a network-based communication fulfillment system 10 includes a communication resource allocation system 30 and one or more product fulfillment centers 40, 41, which communicate via a computer network 80. The network-based communication fulfillment system 10 can be operated by a communication service provider such as Shutterfly Business Solutions.

The communication resource allocation servers 32 can power a website and mobile applications, which are accessible by business owners such as a business user 70 using a computer device 60 such as a mobile device, a desktop computer. The network-based communication fulfillment system 10 receives requests for communication services from the business user 70 via the Internet 50 or a wireless network 51.

The requests can specify the types of communications, the content and design of the communications, the properties of the physical communications in the communication services, and recipients of the communications. The requests can also define the time(s) and frequencies of the communications to the recipients. The recipients are typically the current or potential customers of the business users.

The types of communications can include electronic forms such as emails, social media, and mobile messages, and physical mailing pieces of hardcopy print products. The content and design of the communications can include text, images, graphics, embellishments, colors and dimensions of all the design elements, layout, etc. for the electronic or physical communications. The properties of the physical mailing pieces can be defined by different sizes, form factors, materials, finishes, packaging, and shipping methods, etc. The recipient information can include the names and the physical and electronic addresses of the recipients.

The product fulfillment center 40 includes a gateway server 42, printers 45 for printing the communication designs on physical surfaces of substrates, finishing equipment 46 for finishing the physical mailing pieces after printing, and a shipping station 48 for confirming the completion of the orders and shipping the physical mailing pieces to recipients 190 and 195. The gateway server 42 communicates with the communication resource allocation system 30 via the computer network 80 and facilitates the communications between different devices and stations in the printing and finishing facility 40. The printers 45 receive digital image data and control data, and reproduce images on physical substrates made of paper, fabrics, plastic, metals, or other materials. Examples of the printers 45 include can be digital printing presses, digital photographic printers, offset digital printers, inkjet printers, etc. The finishing equipment 46 perform finishing operations after printing, for example, cutting, folding, adding a cover to photo book, punching, stapling, gluing, binding, envelope printing and sealing, packaging, labeling, package weighing, and postage metering, etc.

The communication resource allocation system 30 includes one or more communication resource allocation servers 32 for communicating with the business users 70, the product fulfillment centers 40, 41, a data storage 34, and other components within the communication resource allocation system 30. The communication resource allocation system 30 also includes one or more communication servers 35, one or more wireless routers 36, and one or more intelligent communication design servers 37. The communication resource allocation system 30 can be implemented in the cloud or with dedicated physical network equipment.

The data storage 34 stores information about the business customers and the recipients, the content and designs of the communications, and the types and timing of the communications. The servers 35 and the wireless routers 36 are configured to transmit electronic communications to recipients 170, 171 specified by the business users 70 in their requests. The electronic communications can be transmitted in wired or wireless communications to computers 160 or mobile devices 161 used by the recipients 170, 171.

The intelligent communication design server 37 is configured to create a customized design for the electronic or physical communications based on the input from the business owners 70. The content as well as transmission or shipping methods (timing, frequencies) are usually personalized for the recipients 170, 171, 190, 195 and based on the needs of the business owners. Customized design information can include text, images, graphics, embellishments, styles, product types, event types, information about the business user (i.e. sender of the communication), information about the recipient (names, special events or occasion for the recipients, etc.).

Moreover, the designs of electronic communications such as emails, social media, and mobile messages can depend on the types of devices on which the recipients will view the electronic communications, the types of browsers for viewing the communications on webpages, the types of operating systems, and the types of social platforms. The page dimensions and form factors are usually different for different electronic communications; the communication designs need to be tailored according to the particular channels and the recipients' devices. In other words, for each communication service of a given content, there can be hundreds of electronic versions. Thus, designing electronic communications can consume significant computation resources.

Similarly, physical mailing pieces have different product types, sizes, form factors, materials, finishes, packaging, and shipping methods. Examples of physical mailing pieces can include post cards, note cards, greeting cards, invitation cards, brochures, booklet, calendars, magnets, catalogs, coupons, banners, posters, totes, which can be printed with photos, text, and graphics, etc. Each physical mailing piece can include one or more pages, or one or more substrate surfaces. Creating customized designs for the physical products not only depend on the sizes, form factors, materials, finishes, but also the types of printing and finishing equipment employed to produce these physical mailing pieces. Each recipient 190, 191 can receive one or more physical mailing pieces in a communication service fulfilled by the network-based communication fulfillment system 10.

Figure 2:
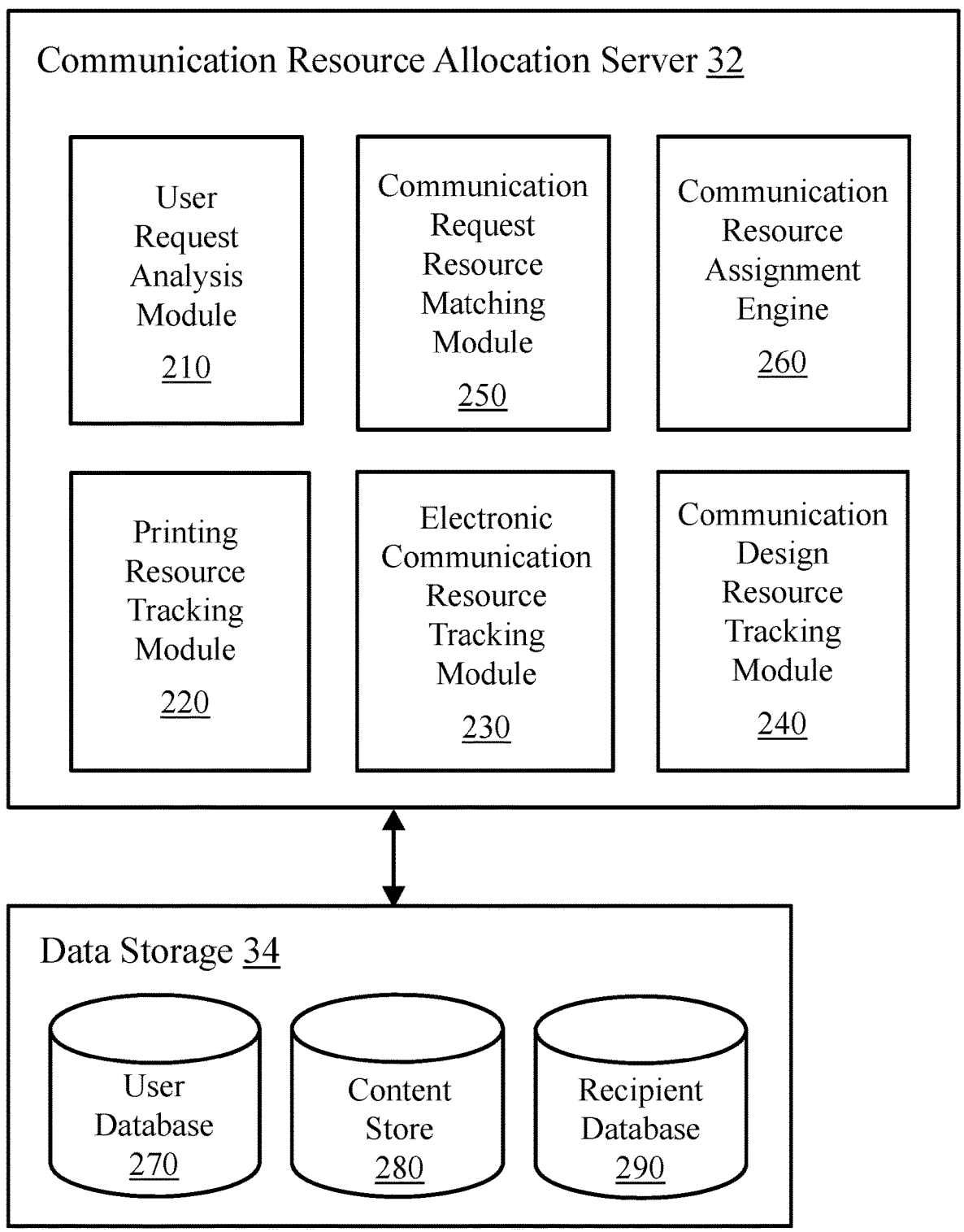
FIG. 2 is a detailed block diagram for a portion of the cloud-based communication resource allocation system in accordance with the present invention.

FIG. 2 illustrates details of the communication resource allocation servers 32 and the data storage 34 in the communication resource allocation system 30. The communication resource allocation server 32 is in communications with the servers and storage in communication resource allocation system 30 and with the gateway servers 42 in the product fulfillment centers 40, 41. In some embodiments, referring to FIGS. 1 and 2, the communication resource allocation server 32 includes a user request analysis module 210, a printing resource tracking module 220, an electronic communication resource tracking module 230, a communication design resource tracking module 240, a communication request resource matching module 250, and a communication resource assignment module 260.

The communication resource allocation server 32 also includes a user database 270, a content store 280, and a recipient database 290. The user data stored in the user database 270 can include account information, discount information, and order information associated with the business users 70. The content store 280 stores the communication content specified in business users' requests, and the designs automatically created by the intelligent communication design servers 37 for different types of electronic or physical communications. The recipient database 290 stores information for a large number of recipients such as names, family members' names, their electronic and physical addresses, their anniversary or birthdays, their preferences and hobbies, communication histories, their response to past communications, etc. The recipient database 290 can also store the communication personalized for each recipient: communication delivery method, frequency, personalization, etc. For each business user 70, each communication service can include a different set of recipients, whose numbers can range from hundreds to millions.

The user request analysis module 210 can automatically analyze business users' requests for communication services: determining the types of communications (physical vs. electronic, types of physical mailing pieces, electronic communication channels, etc.), determining the content (complexity text, image, graphics objects), accessing the amount of design work (e.g. level of customization, the number of variations of different electronic channels including device types, operating systems, types of viewing software, and viewing platforms, different types of physical mailing pieces, etc.), and assessing the amount of printing and finishing work for the physical mailing pieces. The user request analysis module can automatically determine an amount of design work required by the request based on degree of overlapping designs between the electronic communications and the physical mailing pieces specified in the user request. The user request analysis module 210 also automatically determine the amount of design work required by the request for communication service based on degree of overlapping designs between the electronic communications and the physical mailing pieces specified in the request.

The printing resource tracking module 220 monitors, via the gateway servers 42, the workloads of the product fulfillment centers 40, 41 on their respective schedules, which include capacity forecast for the printers 45, finishing equipment 46, and shipping stations 48. The electronic communication resource tracking module 230 monitors the workload of the communication servers 35 and wireless router 36. The number of electronic communications can be much higher than the number of physical communications. Moreover, the communication servers 35 and wireless router 36 may need to handle response and feedback from the devices 160, 161 by the recipients 170, 171. The communication design resource tracking module 240 monitors the anticipated workloads of the intelligent communication design servers 37 based on the communication services already committed to different business users 70. As described above, the amount of design work is dependent on the types of communications.

The communication request resource matching module 250 can find communication resources for the communication services specified in business users' requests. For each communication request, the communication request resource matching module 250 receives all resource needs in the user request from the user request analysis module 210. The communication request resource matching module 250 also receives resource workload and availability information from the printing resource tracking module 220, the electronic communication resource tracking module 230, and the communication design resource tracking module 240. The communication request resource matching module 250 attempts to match the available design, printing, and transmission resources with resource needs in the user request.

Based all the above input information, the communication request resource matching module 250 makes determination if a communication service can be fulfilled in the timeframe specified in the business user's request. It should be noted that there can be multiple product fulfillment centers 40, 41, multiple communication design centers, and multiple electronic communication resources, which the communication request resource matching module 250 is configured to access for evenly distributing tasks for the fastest fulfillment for all communications services. The tasks of one communication service can be distributed across different such service resource centers. If so, the communication resource assignment module 260 assigns the appropriate resources and schedule them to perform various tasks: designing communication content by the intelligent communication design servers 37 for all versions and channels, transmitting electronic messages and receiving response by the communication servers 35 and wireless router 36, and manufacturing and shipping physical mailing pieces by the product fulfillment centers 40, 41.

Otherwise, the communication resource allocation server 32 replies to the business user 70 and possibly suggests a different schedule from the first request. For example, if the product fulfillment centers 40, 41 are expected to be short in capacity for the requested communication service, the communication resource allocation server 32 may suggest and renegotiate extra time for the deliveries of the physical mailing pieces.

It should be noted that the communication resource allocation server 32 is also configured to communicate pricing information to the business users 70. The prices for electronic or physical communication depend on the complexities in content, volume, number of electronic channels and platform variations, and workloads in creating the design, transmission, and manufacturing the physical mailing pieces. The price can also depend on the urgency of the communication jobs. For example, communications services that can be schedule further into the future can be provided at discount prices.

Figure 3:
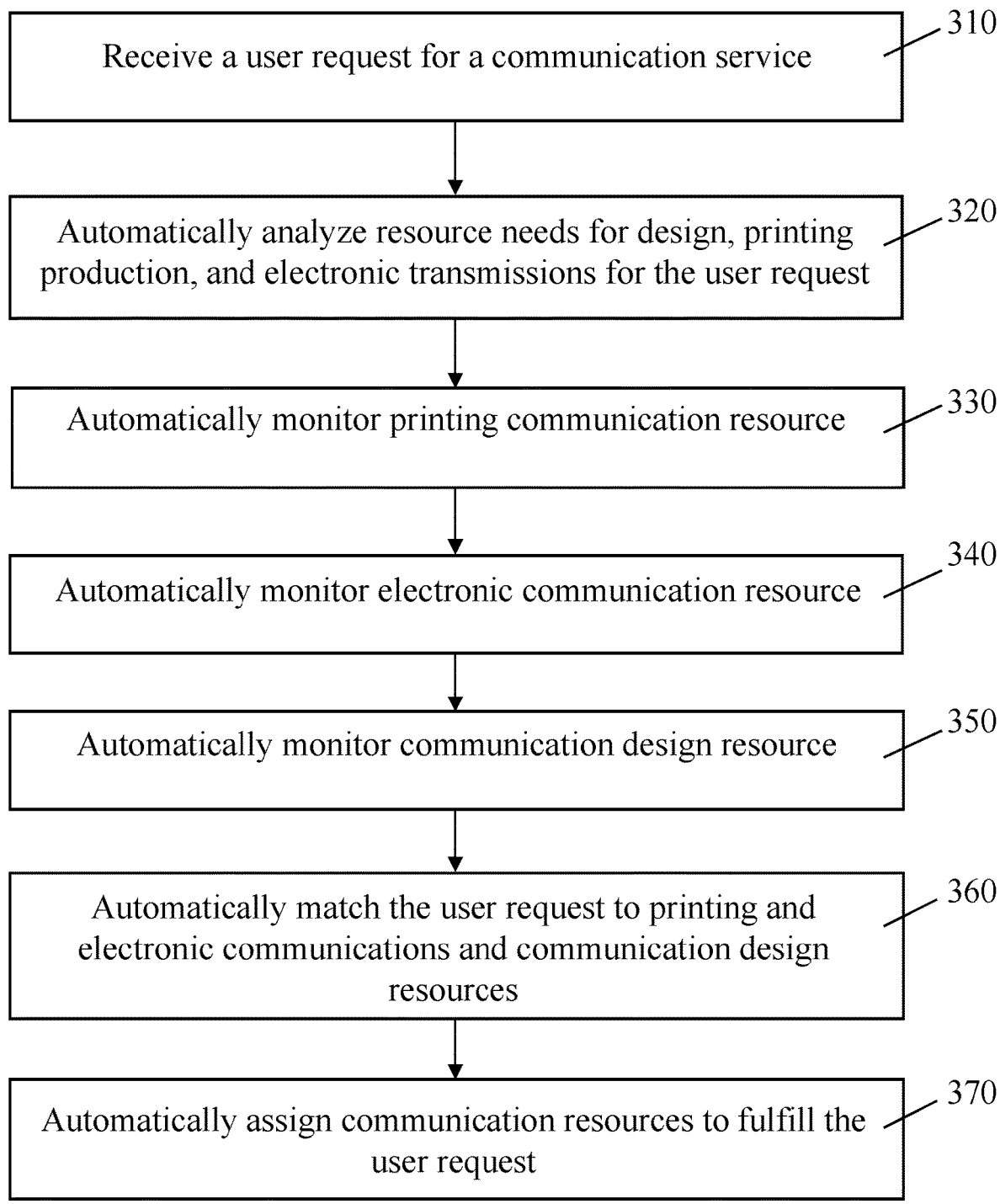
FIG. 3 is a flow diagram for allocating communication resources by the cloud-based communication resource allocation system in accordance with the present invention.

The allocation of communication resources for a communication request can include one or more of the following steps in the disclosed network-based communication fulfillment system. Referring to FIGS. 1-3, a request for a communication service by a business customer is received (step 310) by a communication resource allocation server. A user request analysis module automatically analyzes the resource needs for the design, printing production, and electronic transmissions for fulfilling the user request (step 320). The communication request can specify different types of communications such as electronic messages and physical mailing pieces. The printing communication resources in the product fulfillment centers are automatically monitored (step 330) by a printing resource tracking module, which includes the printing and finishing tasks already scheduled to fulfill scheduled communication services. The electronic communication resources are automatically monitored (step 340) by an electronic communication resource tracking module, which includes the electronic transmission tasks already scheduled to fulfill scheduled communication services. The communication design resources are automatically monitored (step 350) by a communication design resource tracking module, which includes the design tasks already scheduled to fulfill scheduled communication services.

Based on the input from the communication request resource matching module, the electronic communication resource tracking module, and the communication design resource tracking module, a communication request resource matching module automatically matches the user requested communication service to print and electronic communication and communication design resources (step 360). A communication resource assignment module then automatically assigns the communication resources to fulfill the user request (step 370).

It should be understood that the presently disclosed systems and methods can be compatible with different devices or applications other than the examples described above. For example, the disclosed method is compatible with different computer devices and network configurations, different forms of physical and electronic communication methods other than the ones described above, and different printing and finishing equipment for reproducing information on physical substrates.

What is claimed is:

1. A network-based communication fulfillment system, comprising:
   a communication resource allocation server that receives a request for a communication service from a business user, wherein the requested communication service includes one or more electronic communications and physical mailing pieces to be sent to one or more recipients;
   an intelligent communication design server that automatically creates designs for the electronic communications and the physical mailing pieces based on the received request;
   a communication server that transmits the electronic communications to at least some of the recipients; and
   one or more product fulfillment centers that print and finish the physical mailing pieces to be mailed to at least some of the recipients,
   wherein the communication resource allocation server comprises:
      a user request analysis module that automatically analyzes types of communication services in the request and that automatically determines amounts of design work, printing and finishing work, and transmission work required to fulfill the requested communication service;
         wherein the user request analysis module automatically determines an amount of design work required by the request based on a level of customization for the communication service and a number of variations of different electronic channels, including device types, operating systems, types of viewing software, and viewing platforms for the communication service;
      one or more modules that monitor workloads and anticipated workloads of the one or more product fulfillment centers, the communication server, and the intelligent communication design server to determine available design, printing, and transmission resources at the one or more product fulfillment centers, the communication server, and the intelligent communication design server;
      a communication resource assignment module that dynamically assigns the available design, printing, and transmission resources with the determined amounts of design work, printing and finishing work, and transmission work for fulfillment of the received request;
         wherein the assigned design resource designs the electronic communications and the physical mailing pieces based on the received request;
         wherein the assigned transmission resource transmits the electronic communication to at least some of the recipients; and
         wherein the assigned printing resource prints and finishes the physical mailing pieces to be mailed to at least some of the recipients.

2. The network-based communication fulfillment system of claim 1, wherein a communication request resource matching module determines if the requested communication service can be fulfilled in a timeframe specified in the request.

3. The network-based communication fulfillment system of claim 1, wherein the user request analysis module automatically determines an amount of design work required by the request based on degree of overlapping designs between the electronic communications and the physical mailing pieces specified in the user request.

4. The network-based communication fulfillment system of claim 1, wherein the user request analysis module automatically determines an amount of design work required by the request based on types of the physical mailing pieces for the communication service.

5. A system for fulfilling requests for communication services, comprising:
   a communication resource allocation server that receives a request for a communication service, wherein the requested communication service comprises one or more of electronic communications and physical mailing pieces to be sent to one or more recipients;
   an intelligent communication design server that automatically creates designs for the electronic communications and the physical mailing pieces based on the received request;
   a communication server that transmits the electronic communications to at least some of the recipients; and
   one or more product fulfillment centers that print and finish the physical mailing pieces to be mailed to at least some of the recipients,
   a user request analysis module that automatically analyzes types of communication services in the request and that automatically determines amounts of design work, printing and finishing work, and transmission work required to fulfill the requested communication service;
      wherein the user request analysis module automatically determines an amount of design work required by the request based on a level of customization for the communication service and a number of variations of different electronic channels, including device types, operating systems, types of viewing software, and viewing platforms for the communication service;
   one or more modules that monitor workloads and anticipated workloads of the one or more product fulfillment centers, the communication server, and the intelligent communication design server to determine available design, printing, and transmission resources at the one or more product fulfillment centers, the communication server, and the intelligent communication design server;
   a communication resource assignment module that dynamically assigns the available design, printing, and transmission resources with the determined amounts of design work, printing and finishing work, and transmission work for fulfillment of the received request;
      wherein the assigned design resource designs the electronic communications and the physical mailing pieces based on the received request;
      wherein the assigned transmission resource transmits the electronic communication to at least some of the recipients; and wherein the assigned printing resource prints and finishes the physical mailing pieces to be mailed to at least some of the recipients.

6. The network-based communication fulfillment system of claim 1, wherein the communication resource allocation server further comprises a communication resource assignment module that assigns the intelligent communication design server to create designs for the electronic communications and the physical mailing pieces specified in the user request.

7. The network-based communication fulfillment system of claim 1, wherein the communication resource allocation server further comprises a communication resource assignment module that assigns the communication server to transmit the electronic communications to the recipients specified in the user request.

8. The network-based communication fulfillment system of claim 1, wherein the communication resource allocation server further comprises a communication request resource matching module that matches the available design, printing, and transmission resources to manufacture the physical mailing pieces to be mailed to the recipients specified in the user request.

9. The network-based communication fulfillment system of claim 1, wherein the one or more modules in the communication resource allocation server comprises: a printing resource tracking module that monitors scheduled jobs for printers and finishing equipment in the one or more product fulfillment centers.

10. The network-based communication fulfillment system of claim 1, wherein the one or more modules in the communication resource allocation server comprises: an electronic communication resource tracking module that monitors scheduled transmission jobs for the communication server.

11. The network-based communication fulfillment system of claim 1, wherein the one or more modules in the communication resource allocation server comprises: a communication design resource tracking module that monitors scheduled design jobs for the intelligent communication design server.

12. A computer-implemented method for automatically designing and fulfilling requests for communication services, comprising:
  receiving, with a communication resource allocation server, a request for a communication service from a user, wherein the requested communication service includes one or more electronic communications and physical mailing pieces to be sent to one or more recipients;
  automatically creating designs, with an intelligent communication design server, for the electronic communications and the physical mailing pieces based on the received request;
  automatically analyzing, with a user request analysis module, types of communication services in the request and automatically determining amounts of design work, printing and finishing work, and transmission work required to fulfill the requested communication service;
    wherein the user request analysis module automatically determines an amount of design work required by the request based on a level of customization for the communication service and a number of variations of different electronic channels, including device types, operating systems, types of viewing software, and viewing platforms for the communication service;
  monitoring, with a printing resource tracking module, workloads and anticipated workloads of the one or more product fulfillment centers, a communication server, and an intelligent communication design server to determine available design, printing, and transmission resources at the one or more product fulfillment centers, the communication server, and the intelligent communication design server;
  dynamically assigning, with a communication resource assignment module, the available design, printing, and transmission resources with the determined amounts of design work, printing and finishing work, and transmission work for fulfillment of the received request;
  designing the electronic communications and the physical mailing pieces by the assigned design resource based on the received request;
  transmitting the electronic communications by the assigned transmission resource to at least some of the recipients; and
  printing and finishing the physical mailing pieces by the assigned printing resource to be mailed to at least some of the recipients.

13. The method of claim 12, further determining if the requested communication service can be fulfilled in a timeframe specified in the request.

14. The method of claim 12, further assigning the communication server to transmit the electronic communications to the recipients specified in the user request.

15. The method of claim 12, wherein the communication resource allocation server further comprises a communication request resource matching module that matches the available design, printing, and transmission resources to manufacture the physical mailing pieces to be mailed to the recipients specified in the user request.

16. The system for fulfilling requests for communication services of claim 5, wherein a communication request resource matching module determines if the requested communication service can be fulfilled in a timeframe specified in the request.

17. The system of claim 5, wherein the user request analysis module automatically determines the content of the electronic communication and the physical mailing piece based on the received request.

18. The system of claim 5, wherein the communication resource allocation server further comprises a communication request resource matching module that matches the available design, printing, and transmission resources to manufacture the physical mailing pieces to be mailed to the recipients specified in the user request.

19. The method of claim 12, wherein the user request analysis module automatically determines the content of the electronic communication and the physical mailing piece based on the received request.

20. The network-based communication fulfillment system of claim 1, wherein the user request analysis module automatically determines the content of the electronic communication and the physical mailing piece based on the received request.

* * * * *